US012008398B2

(12) United States Patent
Yasin et al.

(10) Patent No.: US 12,008,398 B2
(45) Date of Patent: Jun. 11, 2024

(54) PERFORMANCE MONITORING IN HETEROGENEOUS SYSTEMS

(71) Applicant: Intel Corporation, Santa Clara, CA (US)

(72) Inventors: Ahmad Yasin, Haifa (IL); Julius Mandelblat, Haifa (IL); Eliezer Weissmann, Haifa (IL); Rajshree A. Chabukswar, Sunnyvale, CA (US); Michael W. Chynoweth, Placitas, NM (US)

(73) Assignee: Intel Corporation, Santa Clara, CA (US)

( * ) Notice: Subject to any disclaimer, the term of this patent is extended or adjusted under 35 U.S.C. 154(b) by 865 days.

(21) Appl. No.: 16/729,370

(22) Filed: Dec. 28, 2019

(65) Prior Publication Data

US 2021/0200580 A1 Jul. 1, 2021

(51) Int. Cl.
*G06F 9/46* (2006.01)
*G06F 9/30* (2018.01)
*G06F 9/32* (2018.01)
*G06F 9/48* (2006.01)

(52) U.S. Cl.
CPC ........ *G06F 9/4881* (2013.01); *G06F 9/30101* (2013.01); *G06F 9/321* (2013.01); *G06F 9/485* (2013.01)

(58) Field of Classification Search
CPC .................................................... G06F 9/4881
USPC ....................................................... 718/102
See application file for complete search history.

(56) References Cited

U.S. PATENT DOCUMENTS

| 6,351,724 | B1* | 2/2002 | Klassen | G06F 11/3466 |
| | | | | 714/39 |
| 7,340,378 | B1* | 3/2008 | Floyd | G06F 11/3466 |
| | | | | 714/25 |
| 8,024,735 | B2* | 9/2011 | Rudd | G06F 9/3851 |
| | | | | 712/228 |
| 8,271,809 | B2* | 9/2012 | Bose | G06F 11/348 |
| | | | | 713/340 |
| 2002/0073255 | A1* | 6/2002 | Davidson | G06F 13/4217 |
| | | | | 714/E11.2 |
| 2003/0233394 | A1* | 12/2003 | Rudd | G06F 9/4881 |
| | | | | 718/107 |

(Continued)

OTHER PUBLICATIONS

Ahmad Yasin, "A Top-Down Method for Performance Analysis and Counters Architecture", IEEE International Symposium on Performance Analysis of Systems and Software (ISPASS), Mar. 2014, 10 pages.

*Primary Examiner* — Mehran Kamran
(74) *Attorney, Agent, or Firm* — Nicholson De Vos Webster & Elliott LLP

(57) ABSTRACT

Embodiments of apparatuses, methods, and systems for performance monitoring in heterogenous systems are described. In an embodiment, an apparatus includes a plurality of performance counters to generate a plurality of unweighted event counts; a weights storage to store a plurality of weight values, each weight value corresponding to an unweighted event count; a plurality of weighting units, each weighting unit to weight a corresponding unweighted event count based on a corresponding weight value to generate one of a plurality of weighted event counts; and a work counter to receive the weighted event counts and generate a measured work amount.

19 Claims, 9 Drawing Sheets

(56) References Cited

U.S. PATENT DOCUMENTS

| | | | | |
|---|---|---|---|---|
| 2004/0236993 A1* | 11/2004 | Adkisson | ............ | G06F 11/349 714/E11.205 |
| 2004/0237003 A1* | 11/2004 | Adkisson | ............ | G06F 11/348 714/47.2 |
| 2005/0081101 A1* | 4/2005 | Love | ............ | G06F 11/3466 714/E11.2 |
| 2005/0155021 A1* | 7/2005 | DeWitt | ............ | G06F 11/348 717/130 |
| 2005/0183065 A1* | 8/2005 | Wolczko | ............ | G06F 9/3861 717/124 |
| 2005/0283677 A1* | 12/2005 | Adkisson | ............ | G06F 11/348 714/E11.205 |
| 2008/0133180 A1* | 6/2008 | Floyd | ............ | G06F 11/348 702/186 |
| 2008/0183430 A1* | 7/2008 | Kitsunai | ............ | G06F 11/348 702/186 |
| 2009/0312983 A1* | 12/2009 | Lee | ............ | G06F 11/3466 702/186 |
| 2011/0320766 A1* | 12/2011 | Wu | ............ | G06F 9/30076 712/E9.016 |
| 2011/0320804 A1* | 12/2011 | Chan | ............ | G06F 3/0688 713/150 |
| 2014/0013142 A1* | 1/2014 | Kalaga | ............ | G06F 1/3234 713/323 |
| 2014/0195828 A1* | 7/2014 | Varma | ............ | G06F 1/3296 713/300 |
| 2015/0277538 A1* | 10/2015 | Yasin | ............ | G06F 1/3243 713/322 |
| 2016/0246647 A1* | 8/2016 | Harris | ............ | G06F 9/5027 |
| 2017/0261380 A1* | 9/2017 | Cher | ............ | G06F 1/206 |
| 2018/0095751 A1* | 4/2018 | Aminot | ............ | G06F 9/30101 |
| 2019/0138437 A1* | 5/2019 | Bennett | ............ | G06F 3/0647 |
| 2019/0332157 A1* | 10/2019 | Hsu | ............ | G06F 1/324 |
| 2021/0200580 A1* | 7/2021 | Yasin | ............ | G06F 9/4881 |

\* cited by examiner

PERFORMANCE MONITORING IN HETEROGENEOUS SYSTEMS

FIELD OF INVENTION

The field of invention relates generally to information processing, and, more specifically, but without limitation, to information processing on heterogeneous computer systems.

BACKGROUND

A computer system may include multiple processors, processor cores, and/or execution cores (generally, "cores"), each having an instruction set architecture (ISA) according to which it executes instructions issued or provided to it and/or the system by software, including application and/or user-level software, system software (e.g., an operating system (OS), virtual machine monitor (VMM), hypervisor, etc.), and/or any other software, program, code, etc. The multiple cores in a computer system may include two or more cores having different ISAs, and/or differing in some other way, such as differing microarchitectures that provide differing performance and/or power consumption capabilities, in which case the computer system may be referred to as heterogeneous.

Heterogeneous systems may provide for the execution and/or performance of software, software threads, processes, work, jobs, tasks, etc. (generally, "tasks") by more than one type of core; for example, a heterogeneous system may provide for a task to be performed by either of two general-purpose cores having different ISAs, by either of two general-purpose cores having different performance and/or power consumption capabilities, and/or by either of a general-purpose (e.g., an application processor) core or a special-purpose (e.g., a graphics processor) core.

Heterogeneous systems may include systems in which two different types of cores are fabricated on the same semiconductor die (e.g., a heterogeneous system-on-chip (SoC)), mounted on the same substrate, and/or contained in the same package (e.g., a heterogeneous system-in-package (SiP).

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
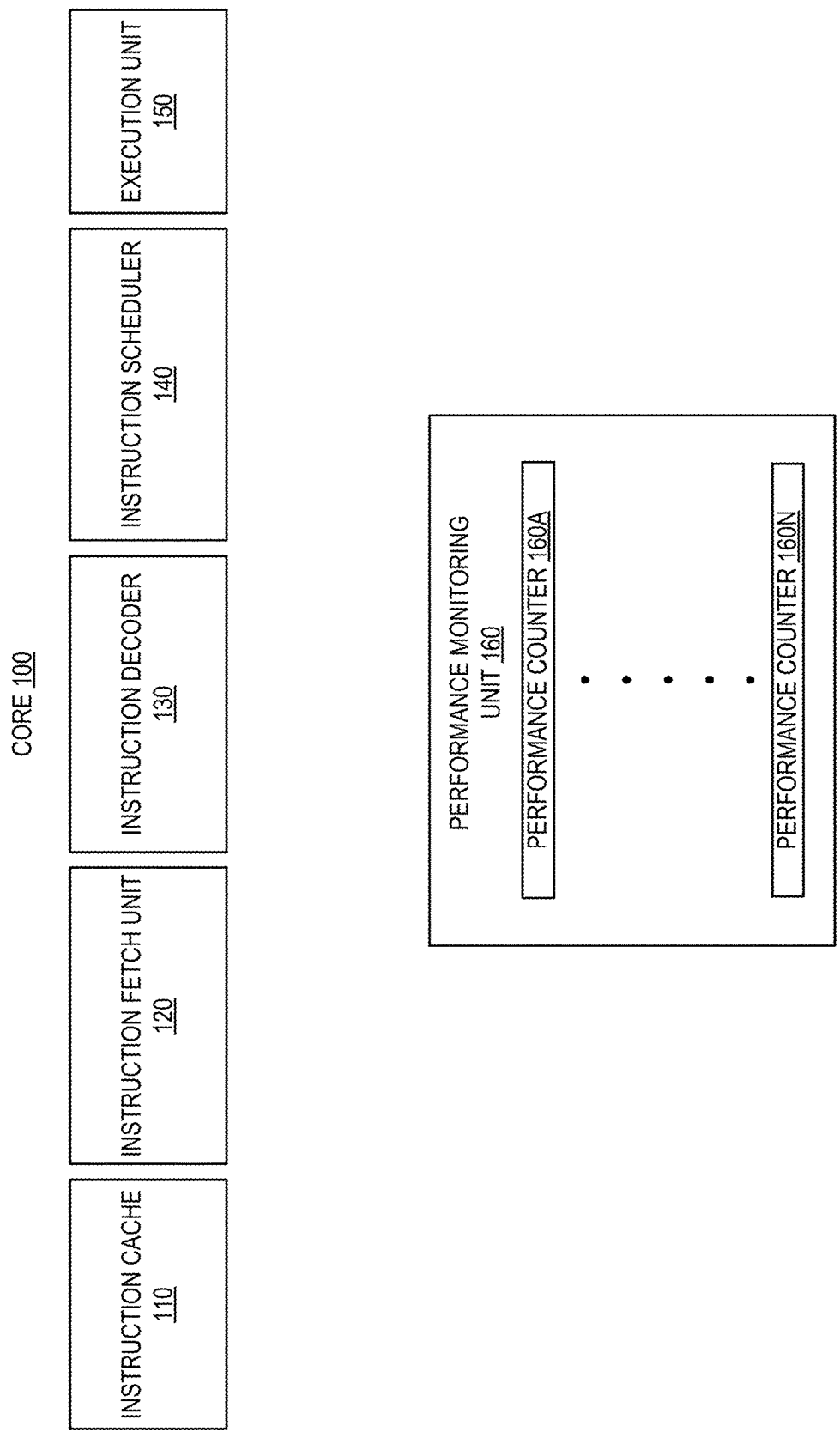
FIG. 1 is a diagram illustrating a processor core according to an embodiment of the invention.

In the following description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

References to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Some embodiments may have some, all, or none of the features described for other embodiments. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

Also, as used in descriptions of embodiments of the invention, a "/" character between terms may mean that an embodiment may include or be implemented using, with, and/or according to the first term and/or the second term (and/or any other additional terms).

As discussed in the background section, a computer system may include multiple cores, each having an instruction set architecture (ISA) according to which it executes instructions issued or provided to it and/or the system by software. In this specification, the use of the term "instruction" is meant to refer to this type of instruction (which may also be called a macro-instruction or an ISA-level instruction), as opposed to: (1) a micro-instruction or micro-operation that may be provided to execution and/or scheduling hardware as a result of the decoding (e.g., by a hardware instruction-decoder) of a macro-instruction, and/or (2) a command, procedure, routine, subroutine, or other software construct, the execution and/or performance of which involves the execution of multiple ISA-level instructions.

In some such systems, the system may be heterogeneous because it includes cores have different ISAs. A system may include a first core with hardware, hardwiring, microcode, control logic, and/or other micro-architecture designed to execute particular instructions according to a particular ISA (or extensions to or other subset of an ISA), and the system may also include a second core without such micro-architecture. In other words, the first core may be capable of executing those particular instructions without any translation, emulation, or other conversion of the instructions (except the decoding of macro-instructions into micro-instructions and/or micro-operations), whereas the second core is not. In that case, that particular ISA (or extensions to or subset of an ISA) may be referred to as supported (or natively supported) by the first core and unsupported by the second core, and/or the system may be referred to as having a heterogeneous ISA.

In other such systems, the system may be heterogeneous because it includes cores having the same ISA but differing in terms of performance, power consumption, and/or some other processing metric or capability. The differences may be provided by the size, speed, and/or microarchitecture of the core and/or its features. In a heterogeneous system, one or more cores may be referred to as "big" because they are capable of providing, they may be used to provide, and/or their use may provide and/or result in a greater level of performance, power consumption, and/or some other metric than one or more other "small" or "little" cores in the system.

In these and/or other heterogeneous systems, it may be possible for a task to be performed by different types of cores. Furthermore, it may be possible for a scheduler to schedule or dispatch tasks to different cores and/or migrate tasks between/among different cores (generally, a "task scheduler"). Therefore, efforts to optimize, balance, or otherwise affect throughput, wait time, response time, latency, fairness, quality of service, performance, power consumption, and/or some other measure on a heterogeneous system may include task scheduling decisions.

For example, if a particular task is mostly stalled due to long latency memory accesses, it is likely more efficient to schedule it on a small core and save power of an otherwise bigger core. On the other hand, heavy tasks may be scheduled on a big core to complete the compute sooner and let the system go into sleep/idle. Due to the diversity of workloads a system (e.g., a client) can perform, the dynamic characteristics of a workload, and conditions of the system itself, it might not be straightforward for a pure software solution to make such decisions. Therefore, the use of embodiments of the invention may be desired to provide information upon which such decisions may be based, in part or in full. Furthermore, the use of embodiments of the invention may be desired in efforts to optimize and/or tune applications based on the information that may be provided.

Embodiments may also or instead provide for other desired benefits, such as enabling predictions of performance scores based on the dynamic characteristics of a system, eliminating a need to run a workload on each core to measure its amount of work by providing ISA-level counters (e.g., number of load instructions) that may be shared among various cores, and lowering the hardware implementation costs of performance monitoring by providing a single counter based on multiple performance monitoring events.

FIG. 1 is a diagram illustrating a core according to an embodiment of the invention. Core 100 in FIG. 1 may be implemented in logic gates and/or any other type of circuitry, all or parts of which may be included in a discrete component and/or integrated into the circuitry of a processing device or any other apparatus in a computer or other information processing system. For example, core 100 in FIG. 1 may correspond to or be included in any of core 490 in FIG. 4B, cores 502A to 502N in FIG. 5, processors 610 and 615 in FIG. 6, processors 770 and 780 in FIGS. 7 and 8, and/or cores 902A to 902N in FIG. 9, each as described below.

Core 100 includes instruction cache 110, instruction fetch unit 120, instruction decode unit 130, instruction scheduler 140, and execution unit 150. Core 100 may include any number of each of these elements (e.g., multiple execution units) and/or any other elements not shown in FIG. 1. Furthermore, embodiments of the invention may exclude elements shown in FIG. 1 (e.g., a core according to an embodiment may be implemented without an instruction cache).

Instruction cache 110 may represent and/or include a memory to store instructions to be decoded and/or executed by core 100. Instruction fetch unit 120 may represent and/or include instruction fetch circuitry and/or hardware to fetch instructions (e.g., from instruction cache 110) to be decoded and/or executed by core 100. Instruction decode unit 130 may represent and/or include the circuitry and/or hardware of an instruction decoder. Instruction scheduler 140 may represent and/or include circuitry and/or hardware to schedule and/or dispatch instructions for execution by core 100. Execution unit 150 may represent and/or include circuitry and/or hardware to execute instructions. Further description of each of these elements may be found in the descriptions of corresponding elements in the processor and/or system embodiments described below.

As mentioned above, instruction scheduler 140 may be an instruction scheduler, implemented in hardware, to schedule and/or dispatch instructions for execution on execution unit 150 (and/or other execution unit in core 100), in contrast to a task scheduler, as discussed previously. In various embodiment, a task scheduler may be implemented in software, firmware, and/or hardware; in one embodiment, a task scheduler may be a module of an OS.

Core 100 also includes a performance monitoring unit 160 including any number of performance counters 160A to 160N to count, monitor, and/or or log events, activity, and/or other measure related to performance. In various embodiments, performance counters 160A to 160N may be programmed by software running on core 100 to log performance monitoring information. For example, any of performance counters 160A to 160N may be programmed to increment for each occurrence of a selected event, or to increment for each clock cycle during a selected event. The events may include any of a variety of events related to execution of program code on core 100, such as branch mispredictions, cache hits, cache misses, translation lookaside buffer hits, translation lookaside buffer misses, etc. Therefore, performance counters 160A to 160N may be used in efforts to tune or profile program code to improve or optimize performance.

Figure 2:
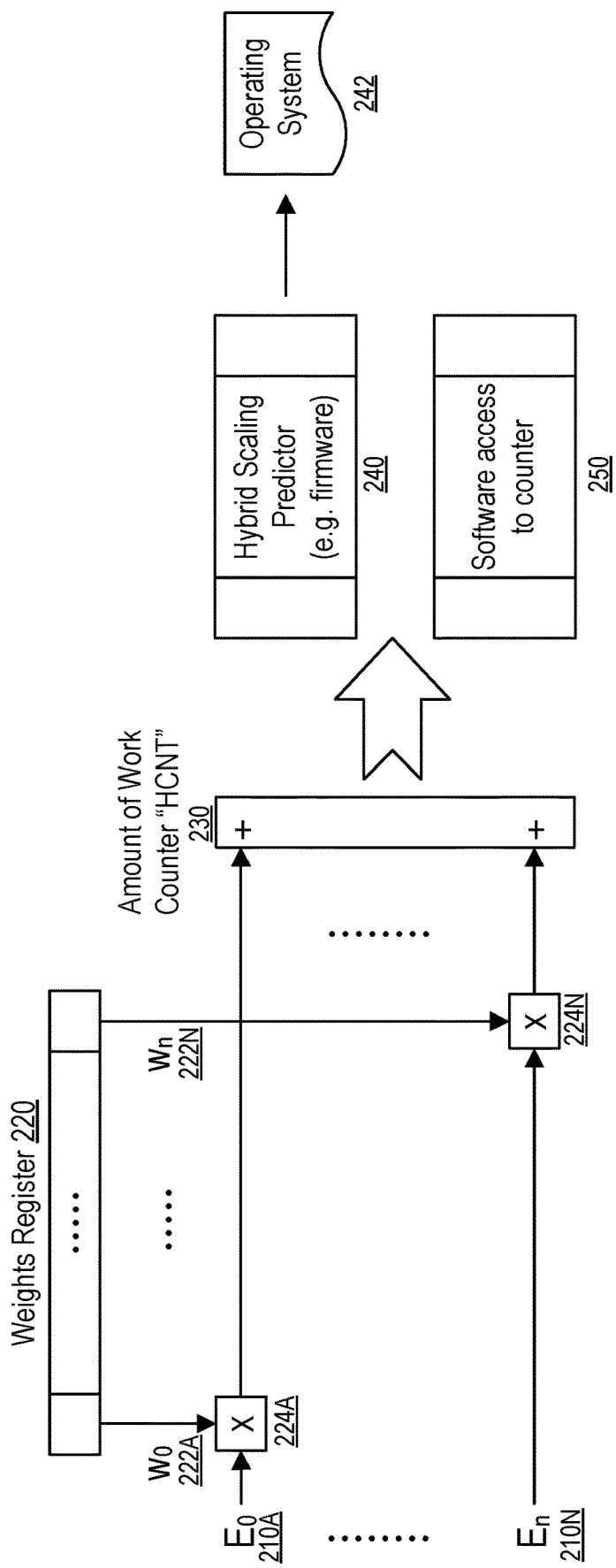
FIG. 2 is a diagram illustrating an apparatus and its usage according to an embodiment of the invention.

FIG. 2 is a diagram illustrating an apparatus and its usage according to an embodiment of the invention. The apparatus shown in FIG. 2 may be implemented in logic gates and/or any other type of circuitry, all or parts of which may be included in a discrete component and/or integrated into the circuitry of a processing device or any other apparatus in a computer or other information processing system. For example, the apparatus may be implemented in a core (such as core 100 in FIG. 1) and/or a system agent (such as system agent 510 in FIG. 5 or FIG. 9) in a heterogeneous SoC, (such as a heterogeneous instance of SoC 900 in FIG. 9).

In FIG. 2, each of any number of unweighted event counts (shown as $E_0$ 210A to $E_N$ 210N) represents an unweighted event count or any other output of a performance counter (generally, each an "unweighted event count"), such as any of performance counters 160A to 160N of FIG. 1. In various embodiments, $E_0$ 210A to $E_N$ 210N may represent a set of any number of unweighted event counts including any number of subsets of unweighted event counts from different cores. For example, the unweighted event counts may be from performance counters all in one core, from one or more performance counters in a first core plus one or more performance counters in a second core, from one or more performance counters in a first core plus one or more performance counters in a second core plus one or more performance counters in a third core, and so on. Furthermore, any one of more of the event counts (e.g., $E_0$ 210A to $E_N$ 210N) may represent an output of (e.g., feedback from) a work counter, such as work counter 230 (as described below), as in an embodiment in which a hierarchical arrangement of performance and work counters is implemented (note that in such an embodiment, an event count may be referred to as an unweighted event count, even though it may have been generated by a work counter based on weighted event counts).

In FIG. 2, weights register 220 represents a programmable or configurable register or other storage location (or combination of storage locations), to store any number of weight values (shown as $w_0$ 222A to $w_N$ 222N), each weight value corresponding to one of the unweighted event counts and to be used by a corresponding weighting unit (shown as weighting units 224A to 224N) to weight the corresponding unweighted event count and generate a weighted event count. For example, software or firmware may assign a weight value of 1 to $E_0$ and a weight value of 2 to $E_N$, in which case weighting unit 224A may weight (e.g., scale or multiply) $E_0$ by a factor of 1 and weighting unit 224N may weight (e.g., scale or multiply) $E_N$ by a factor of 2. In various embodiments, any weight values (including 0), range of weight values, and/or weighting approach (e.g., multiplying, dividing, adding, etc.) may be used. In various embodiments, implementations of a weights register and/or weighting units may limit the choice of weight values to one of a number of possible weight values.

In FIG. 2, weighted event counts (shown as the outputs of weighting units 224A to 224N) are received for processing by a work counter (shown as HCNT 230). In an embodiment, the processing of weighted event counts may include summing the weighted event counts to generate a measure of an amount of work (generally, a "measured work amount"). Various embodiments may provide for this measured work amount to be based on a variety of performance measurements or other parameters, each scaled or manipulated in a variety of ways, and to be used for a variety of purposes. In an embodiment, a work counter may be used to provide a dynamic profile of the current workload.

For example, HCNT 230 may be used to generate a weighted sum of various classes of performance monitoring events that can be dynamically estimated by all cores in an SoC. The events may be sub-classes of an ISA (e.g., AVX floating-point, AVX2 integer), special instructions (e.g. repeat string), or categories of bottlenecks (e.g., front-end bound from top-down analysis). The weights may be chosen to reflect a performance ratio (e.g., 2 for an instruction class that executes twice as fast on a big core and 1 for all other instruction classes), a scalar of amount of work (e.g., 2 for fused-multiply instructions), etc.

Embodiments may provide for any of a variety of events to be counted and/or summed, including events related to arithmetic floating-point 128-bit vector instructions, arithmetic integer 256-bit vector instructions, arithmetic integer vector neural network instructions, load instructions, store instructions, repeat strings, top-down micro-architectural analysis (TMA) level 1 metrics (e.g., front-end bound, back-end bound, bad speculation, retiring), and/or any performance monitoring event counted by any counter.

In addition to a work counter according to an embodiment of the invention, FIG. 2 illustrates a representation of usages of a work counter according to embodiments of the invention, including by a hybrid scaling predictor 240 and/or by any software 250 having access to the work counter. In an embodiment, hybrid scaling predictor 240 may be implemented in firmware, may provide information to an OS 242, and/or may be used to predict performance scaling (e.g., between big and little cores).

In an embodiment, a work counter may be used to provide hints to an operating system running on a heterogeneous SoC or system, where the hints may provide for task scheduling that may improve performance and/or quality of service. For example, a heterogeneous client system including one or more big cores and one more little cores may be used to run artificial intelligence (AI) applications including a particular class of instructions that may speed up processing of the type typically used in AI applications, particularly or only if executed on a big core. The use of a work counter programmed to monitor execution of this class of instruction may provide hints to an OS to guide the OS to schedule threads including these instructions on big cores instead of little cores, thereby improving performance and/or quality of service.

Embodiments may include various other features within the scope of the invention. In embodiments, the weight values are programmable to provide for tuning of the weights (e.g., in a lab) based on actual results. In embodiments, one or more weights of zero may be used to disconnect a particular event or class of events. In embodiments, one of more weights of zero may be used for isolating various components that feed into a work counter. Embodiments may support an option for hardware and/or software (e.g., an OS) to enable/disable a work counter for any of a variety of reasons, for example, to avoid power leakage when the work counter is not in use.

Figure 3:
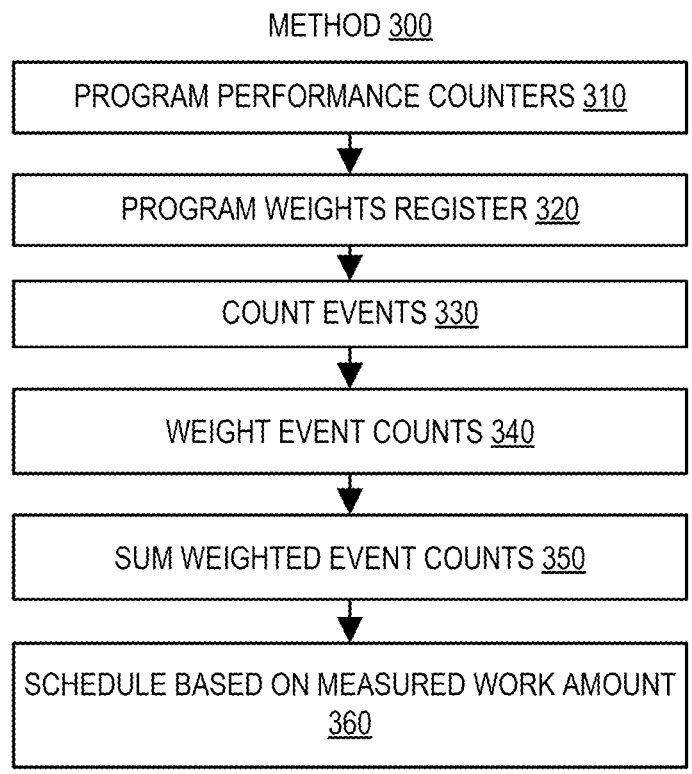
FIG. 3 is a diagram illustrating a method for performance monitoring in a heterogeneous system according to an embodiment of the invention.

FIG. 3 illustrates a method 300 for performance monitoring on a heterogeneous system according embodiment of the invention. In 310, one or more sets and/or subsets of performance counters (e.g., performance counters 160A to 160N) are programmed (e.g., by an OS) to count events related to and/or that may result from the execution of one or more tasks. In 320, a weights register (e.g., weights register 220) is programmed (e.g., by the OS) with weight values based on the importance of a corresponding event to a one or more task scheduling decisions.

In 330, each of a number of performance counters counts events during a time period in which the one or more tasks, or other tasks, are executed. In 340, during the time period, each of the counts (e.g., event counts 220A to 220N) from the performance counters are weighted (e.g., by weighting units 224A to 224N, respectively), based on a corresponding weight value from the weights register, to generate weighted counts. In 350, during the time period, the weighted counts are received and processed (e.g., summed) by a work counter (e.g., HCNT 230) to generate measured work amount.

In 360, during or after the time period, the measured work amount may be used (e.g., by an OS) as a hint or a basis for scheduling, dispatching, and/or migrating tasks to/among cores in the heterogeneous system.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

Figure 4A:
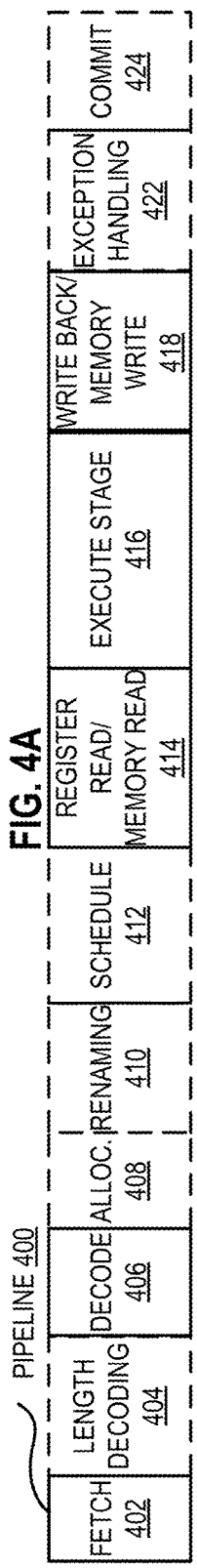
FIG. 4A is a block diagram illustrating both an exemplary in-order pipeline and an exemplary register renaming, out-of-order issue/execution pipeline according to embodiments of the invention.
Figure 4B:
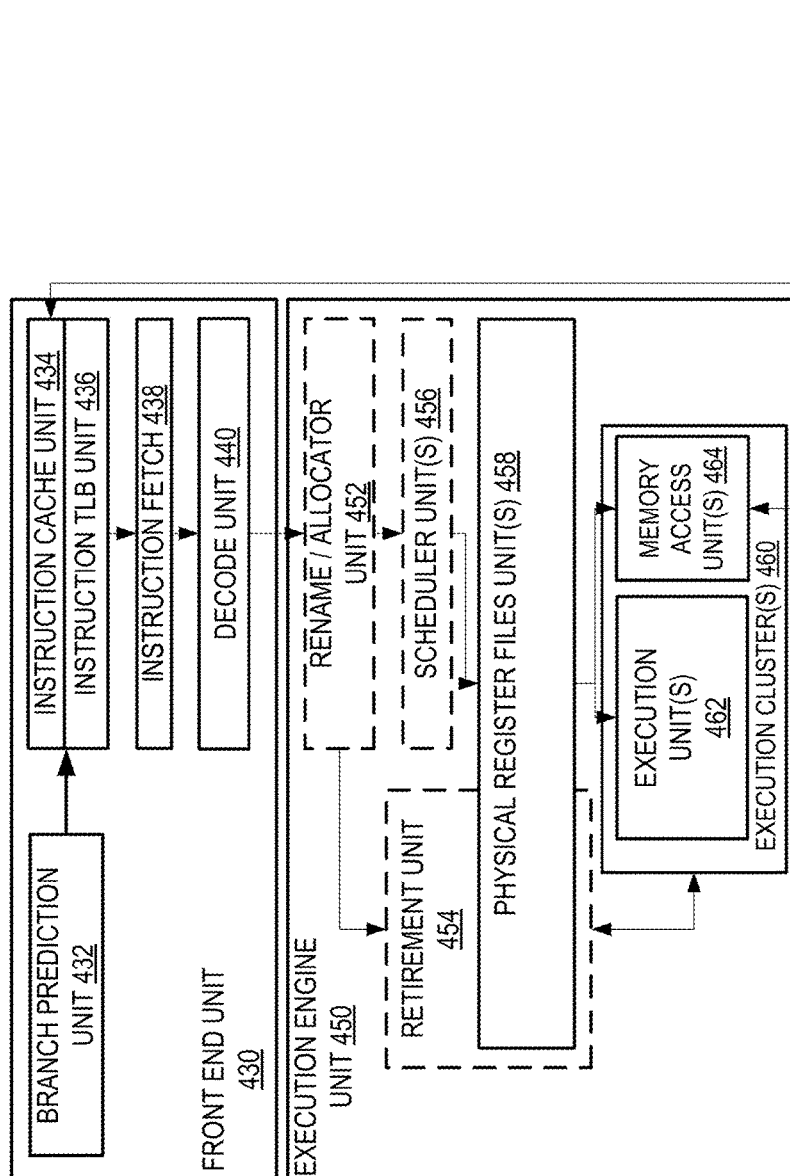
FIG. 4B is a block diagram illustrating both an exemplary embodiment of an in-order architecture core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
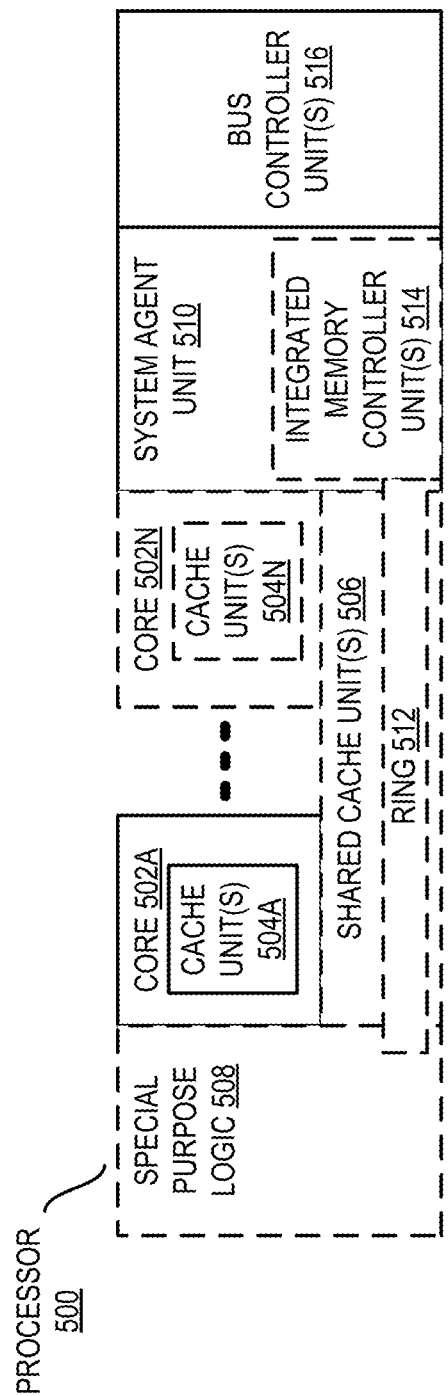
FIG. 5 is a block diagram of a processor that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
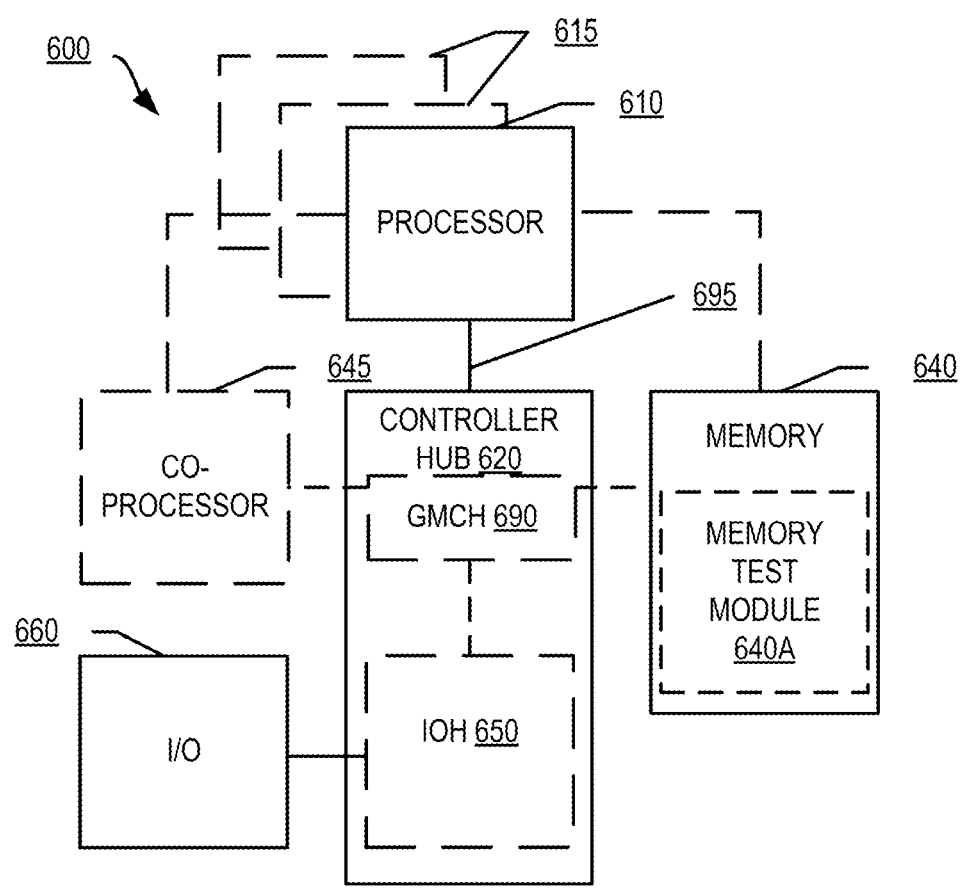
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
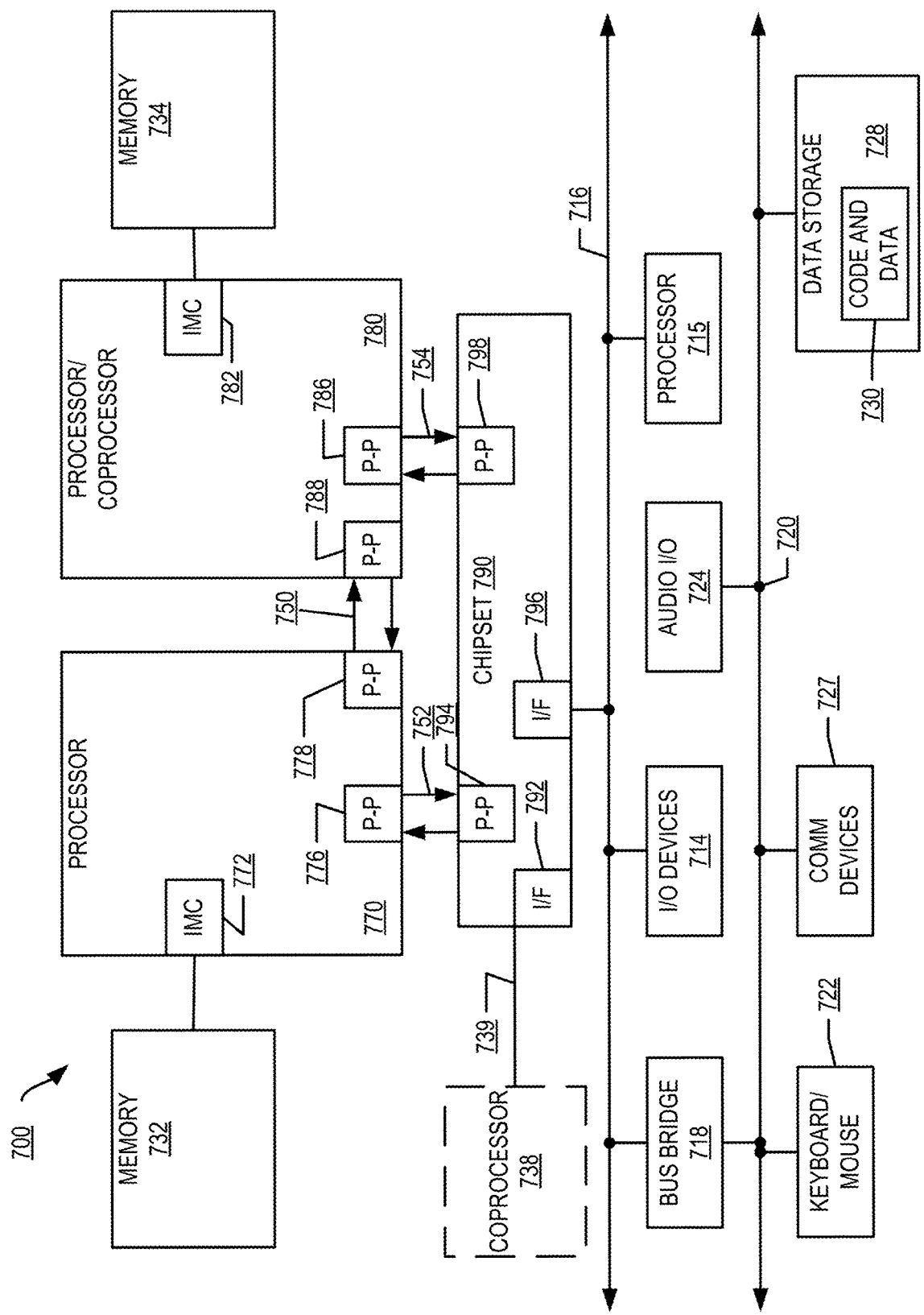
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
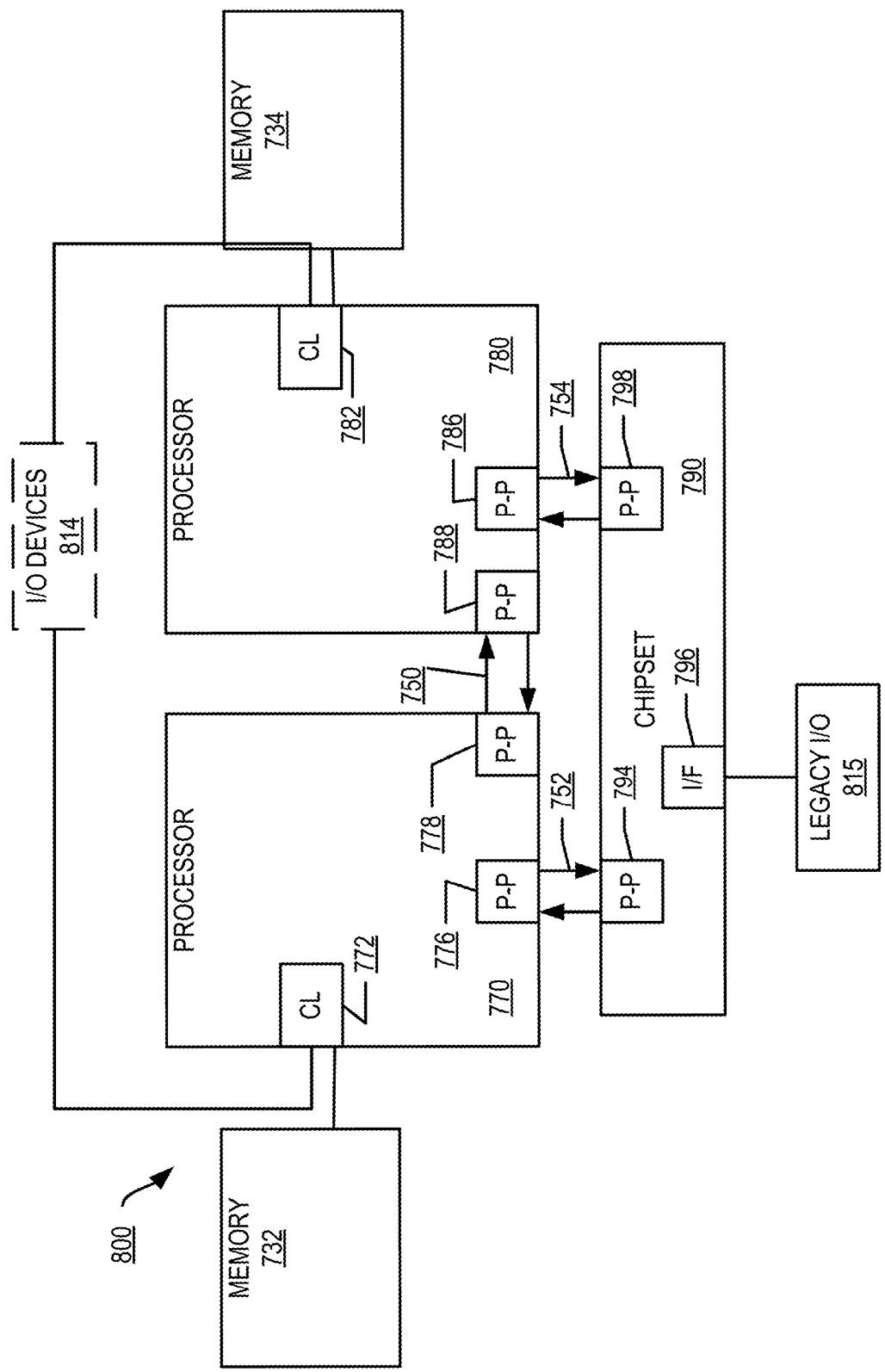
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
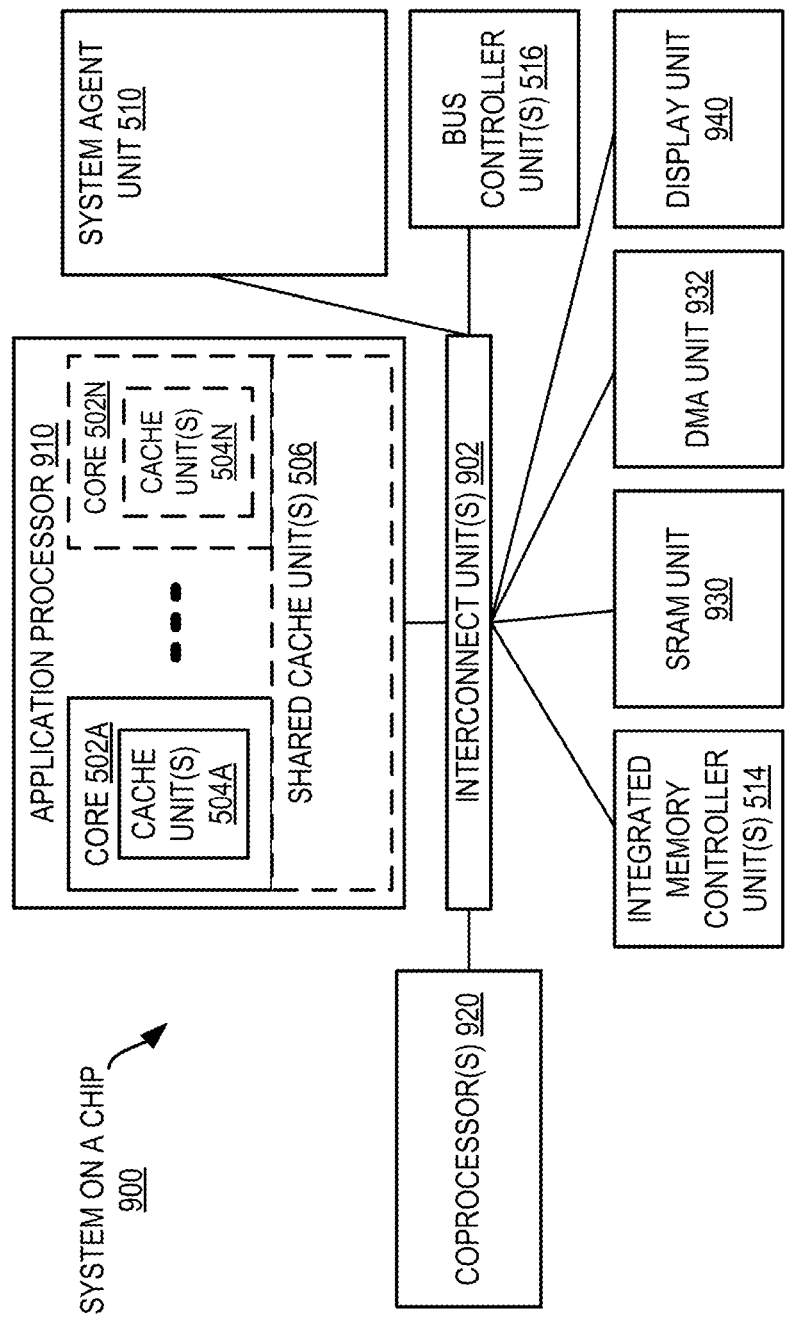
FIG. 9 is a block diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In this specification, operations in flow diagrams may have been described with reference to exemplary embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
a first core of a first type;
a second core of a second type, wherein the second type is different from the first type;
a plurality of performance counters to generate a plurality of unweighted event counts;
a weights storage to store a plurality of weight values, each weight value corresponding to an unweighted event count;
a plurality of weighting units, each weighting unit to weight a corresponding unweighted event count based on a corresponding weight value to generate one of a plurality of weighted event counts;
a work counter to receive the weighted event counts and generate a measured work amount; and a scaling predictor to use the measured work amount to provide hints to an operating system to predict performance scaling between the first core and the second core.

2. The apparatus of claim 1, wherein the weights storage includes a programmable register.

3. The apparatus of claim 1, wherein each of the plurality of weighting units includes a multiplier to generate the weighted event count by multiplying the corresponding unweighted event count by the corresponding weight value.

4. The apparatus of claim 3, wherein the corresponding weight value is one of a plurality of possible weight values.

5. The apparatus of claim 4, wherein the plurality of possible weight values includes zero.

6. The apparatus of claim 1, wherein the work counter includes an adder to generate the measured amount of work by summing the weighted event counts.

7. A method comprising:
programming a plurality of performance counters to generate a plurality of unweighted event counts;
programming a weights storage to store a plurality of weight values, each weight value corresponding to an unweighted event count;
weighting each of the plurality of unweighted event counts based on a corresponding weight value to generate one of a plurality of weighted event counts;
generating a measured work amount based on the plurality of weighted event counts; and
using the measured work amount to provide hints to an operating system to predict performance scaling between the first core and the second core.

8. The method of claim 7, wherein weighting each of the plurality of unweighted event counts based on the corresponding weight value to generate one of the plurality of weighted event counts includes multiplying each of unweighted event counts by the corresponding weight value.

9. The method of claim 7, wherein the corresponding weight value is one of a plurality of possible weight values.

10. The method of claim 9, wherein the plurality of possible weight values includes zero.

11. The method of claim 7, wherein generating the measured work amount based on the plurality of weighted event counts includes summing the weighted event counts.

12. The method of claim 7, further comprising scheduling a first task to the first core based on the measured work amount, wherein the first core is of a first type in a system including the second core of a second type, wherein the second type is different from the first type.

13. The method of claim 12, further comprising scheduling a second task to the second core based on the measured work amount.

14. A system comprising:
a system memory to store a software task scheduler;
a first core of a first type;
a second core of a second type, wherein the second type is different from the first type;
a plurality of performance counters to generate a plurality of unweighted event counts;
a weights storage to store a plurality of weight values, each weight value corresponding to an unweighted event count;
a plurality of weighting units, each weighting unit to weight a corresponding unweighted event count based on a corresponding weight value to generate one of a plurality of weighted event counts;
a work counter to receive the weighted event counts and generate a measured work amount; and
a scaling predictor to use the measured work amount to provide hints to an operating system to predict performance scaling between the first core and the second core.

15. The system of claim 14, wherein the weights storage includes a programmable register.

16. The system of claim 14, wherein each of the plurality of weighting units includes a multiplier to generate the weighted event count by multiplying the corresponding unweighted event count by the corresponding weight value.

17. The system of claim 14, wherein the work counter includes an adder to generate the measured amount of work by summing the weighted event counts.

18. The system of claim 15, wherein the software task scheduler is to program the weights storage to provide for the software task scheduler to use the measured work amount as a hint for scheduling the task to one of the first core or the second core.

19. The system of claim 18, wherein the hint is related to a class of instruction to be executed to perform the task.

* * * * *